UNITED STATES PATENT OFFICE 2,068,062

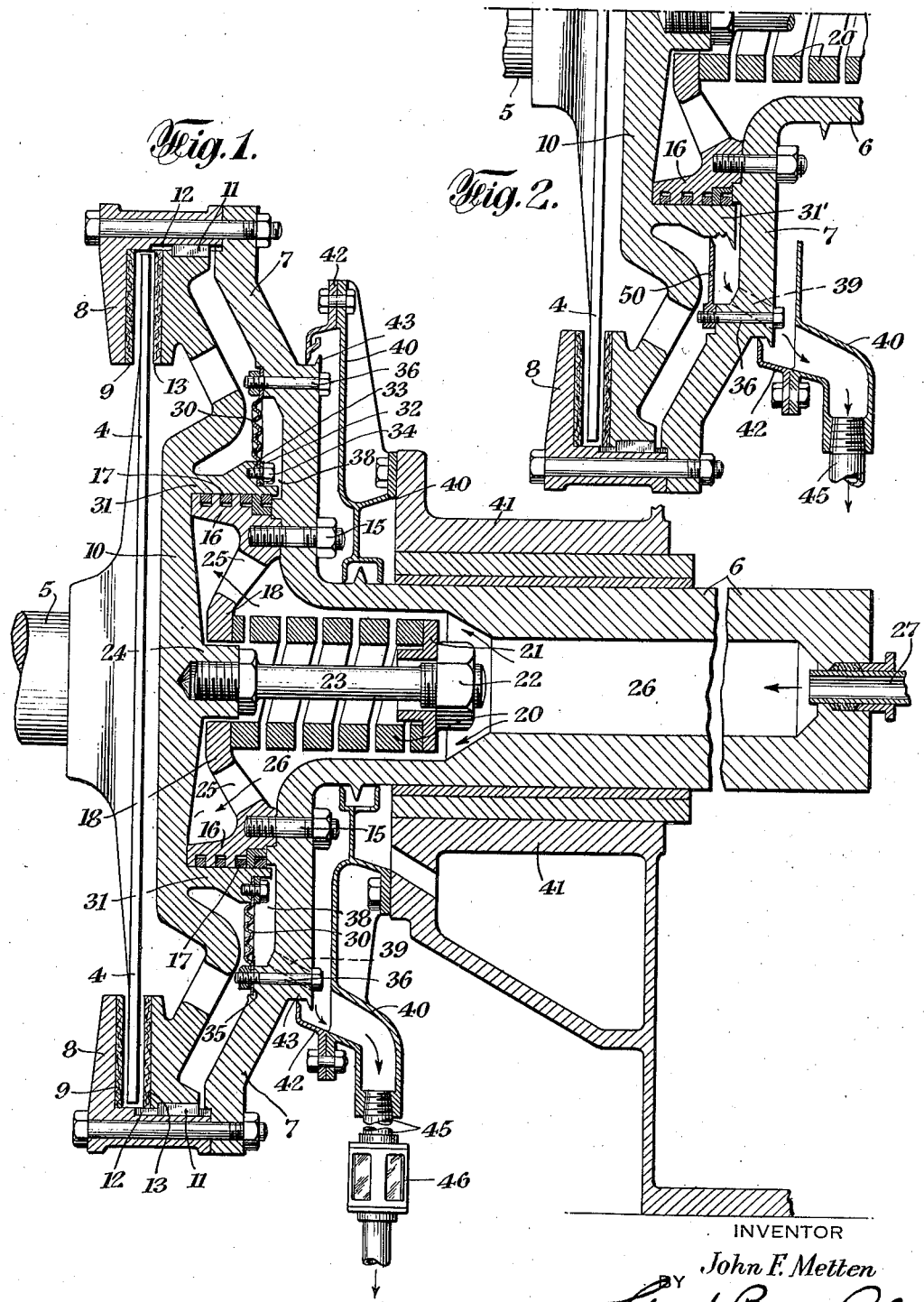

FLUID CLUTCH

John F. Metten, Philadelphia, Pa.

Application October 19, 1934, Serial No. 749,059

4 Claims. (Cl. 192—85)

This invention relates to clutches and particularly to clutches of the friction type in which the relatively rotatable parts are forced together by fluid pressure to provide the clutch action.

The object of the invention is to provide a clutch of this type for large powers and adapted to operate effectively at high speeds.

Prior clutches of the fluid pressure operated type have been limited in speed by the relatively large diameter of the fluid pressure chamber due to the resulting high pressures developed in the clutch chamber by the centrifugal force of the contained operating liquid. The total axial thrust developed by centrifugal force of a revolving contained liquid in a circular chamber increases as the fourth power of the diameter, and also as the square of the number of revolutions per minute. It will be evident that for a given limiting axial thrust due to centrifugal action of the liquid in the clutch chamber the limiting speed will vary inversely as the square of the diameter of the liquid container. This resulting axial thrust therefore increases as the square of the R. P. M. and as the fourth power of the diameter and with increase in speed and diameter rises in magnitude so rapidly that the resulting structures become impracticable, it being difficult for instance to provide springs of sufficient power to effect release while the clutch is at full speed. Moreover, as the power of the release springs is increased the operating pressure must be increased also as the effective friction load at reduced speeds is reduced by the amount of spring load necessary to effect release at the higher speeds. Any attempt to reduce the diameter of the fluid chamber is also met with complications due to the rapid increase in the operating pressure required since the total effective pressure varies as the square of the chamber diameter and any reduction in diameter requires a corresponding increase in the fluid pressure to maintain the total pressure sufficient to give the necessary clutch action.

In the clutch of this invention the above objectionable limitations are overcome and the construction is such as to permit use of a chamber of small diameter with high operating pressures to maintain efficient conditions in the release and engagement of the clutch at all speeds.

In the accompanying drawing illustrating the invention

Fig. 1 is a vertical sectional view of a clutch and its operating parts, and

Fig. 2 is a similar partial view of a modification.

In the specific embodiment shown in Fig. 1 the clutch is shown in disengaged condition with the driven disk 4 on shaft 5 and the drive shaft 6 with the clutch flange 7 to the periphery of which is bolted the inwardly flanged ring 8 carrying a disk of suitable high friction material 9. The movable clutch disk 10 is slidably keyed at 11 in slots 12 of the ring 8 and carries an annular facing 13 of friction material opposite the ring 9. Secured by bolts 15 to the clutch flange 7 is a piston 16 shown with four packing rings 17 contained in peripheral grooves in the piston. This piston 16 is flanged inwardly at 18 to carry the base of the release spring 20. At the other end of the spring 20 is a washer 21 which bears against the nut 22 of the spring stud 23, which is threaded into a boss 24 at the center of the movable driving member 10 of the clutch.

The interior of the piston 16 communicates through openings 25 with the central bore 26 of the clutch disk and shaft connected at 27 to a source of controlling fluid pressure. The spring 20 is compressed by the nut 22 so that its pressure is greater than the axial thrust on the disk 10 due to the pressure developed under the action of the centrifugal forces of the actuating liquid contained in the piston chamber at operating speed.

In operation the movable driver member 10 will be free to move axially an amount limited in the release position (to the right) by the end of the piston 16 as shown, and when pressure is applied to the fluid pressure chamber, the clutch movement (to the left) is limited by clamping the driven disk 4 between the friction disks 9 and 13. It will be evident that the load due to liquid pressure on the area of the piston 16 will be transmitted to the friction surfaces 9 and 13 clamping the periphery of the driven disk 4 between the two friction surfaces so that the torque transmitted through these surfaces will be that due to the load on the piston 16, multiplied by the friction coefficient of the friction material and doubled because the piston load is transferred through both friction rings 9 and 13 and only half the torque is carried by each ring. The outer ring 9 transmits the friction torque direct to the driving shaft 6 being fixed thereto. The inner friction ring 13 also transmits its friction torque to the driving shaft 6 through the sliding keys 11 previously referred to.

In order to carry off the leakage past the piston rings 17 of the piston 16 there is provided a flexible diaphragm 30, the inner edge of which is secured to a flange on the end of the cylinder 31 carried by the movable clutch member 10, the diaphragm being bolted in place by securing ring 32 and studs 33 with nuts 34. The outer edge of this diaphragm 30 is secured to the fixed clutch flange 7 by the ring 35 and bolts 36 forming liquid-tight joints in both cases.

Any leakage from the piston packing 17 will be carried outwardly into the annular chamber 38 which is drained by holes 39 drilled through the clutch flange 7 as shown. A stationary oil baffle 40 is carried on the end of the bearing member 41 for the shaft 6 and this baffle is provided with a ring 42 which has an inward flange just clear of the extension 43 of the clutch flange 7. By these means a chamber is formed in which the leakage from the clutch piston is collected and passed down through the drain 45 to the sight glass 46 below.

The clutch is operated by admitting oil or other operating liquid through a stuffing box 27 on the end of the shaft to the axial bore 26 connecting to the operating cylinder as above described. As the pressure is increased the initial tension on the spring 20 will be overcome and the movable disk 10 will be forced to the left to clamp the disk 4 between the clutch facings 9 and 13. When the pressure is released the spring 20 will separate the clutch parts to the position shown in Fig. 1.

The modification illustrated in Fig. 2 shows an alternative method of carrying off the leakage past the piston rings 17 which omits the diaphragm 30 of Fig. 1 and fitting an annular baffle plate 50 attached at its periphery to the clutch flange 7 and fitting closely at its inner end to the external part of the cylinder extension 31'. The portion of the cylinder 31' extending inside the baffle 50 is grooved or serrated to throw off the leakage by centrifugal force so that it will be carried off through the passages 39 in the clutch disk 7 the same as shown in Fig. 1.

The clutch construction of this invention permits attainment of high speeds by a simple compact combination of the clutch disks and operating parts. The formation of the cylinder 31 on the movable member 10 directs any leakage backward away from the friction facings 9, 13 and allows the deflecting and draining means to be neatly assembled on opposite sides of the clutch flange with communication by the draining passages at the conveniently angled portion of the flange. The sight glass 46 gives a continuous check on the amount of the leakage observable at all times.

The releasing spring 20 is neatly assembled in the fluid pressure chamber and of a diameter permitting it to fit within the bore of the clutch shaft 6. This small size of the releasing spring is in turn permissible due to the reduced axial thrust developed by the centrifugal forces in the liquid contained in the revolving fluid pressure chamber. This chamber has a diameter only about one half of that of the friction disks, and, therefore, while providing a large torque arm for the frictional gripping surfaces greatly reduces the pressures developed centrifugally. Compared with an operating liquid diameter equal to that of the friction rings, this clutch with reduced diameter of the liquid chamber can be operated at four times the speed of a structure using a fluid pressure chamber equal to the mean diameter of the friction disks. The smaller diameter of the fluid chamber will give the same total axial thrust due to the centrifugal force of revolving liquid at the much higher speed. This means that the force required to release the clutch against the centrifugal pressures is correspondingly reduced with reduction in diameter of the fluid chamber, requiring in turn a smaller releasing spring, such as is shown at 20.

I claim:

1. A rotary clutch comprising relatively movable members providing annular friction surfaces of relatively large diameter, a cylinder and piston of relatively small diameter carried by said members, the cylinder opening in a direction away from said annular friction surfaces, means supplying fluid pressure to said cylinder to relatively move said members to clutching position, a spring means held under initial tension tending to move said members to clutch releasing position and having sufficient pressure to overcome the counter pressure developed centrifugally on the fluid in said cylinder as the clutch rotates, and diaphragm means between said members adapted to deflect leakage from said cylinder and drain said leakage off out of contact with said annular friction surfaces.

2. In clutch actuating means the combination with a clutch member of a relatively movable disk carried thereby, cooperating annular clutching surfaces on said member and said disk and cooperating parts on said member and said disk forming a pressure chamber between them at the center thereof of less diameter than said clutching surfaces, spring means in said pressure chamber at the center thereof and tending to move said disk relatively to said clutch member, and fluid pressure supply means for said chamber adapted to apply pressure to move said disk to compress said spring means.

3. In clutch actuating means the combination with a clutch member of a relatively movable disk carried thereby cooperating annular clutching surfaces on said member and said disk and cooperating parts on said member and said disk forming a pressure chamber between them at the center thereof of less diameter than said clutching surfaces, spring means in said pressure chamber at the center thereof and tending to move said disk relatively to said clutch member, a hollow drive shaft connected to said disk and surrounding and enclosing a portion of said spring means, and fluid pressure supply means for said chamber and the hollow portion of said shaft adapted to apply pressure to move said disk to compress said spring means.

4. In a clutch a driven disk and cooperating friction rings engaging the surfaces of said disk, clutch members supporting said rings and forming between them a central fluid pressure chamber of smaller diameter than said rings and annular diaphragm means carried by said members between said pressure chamber and said rings and forming a discharge chamber for leakage from said pressure chamber, and means for discharging said leakage from said discharge chamber so as to protect said engaging surfaces therefrom.

JOHN F. METTEN.